INVENTOR.
HARRY B. WILLETT.
BY
Lockwood, Goldsmith & Galt,
ATTORNEYS.

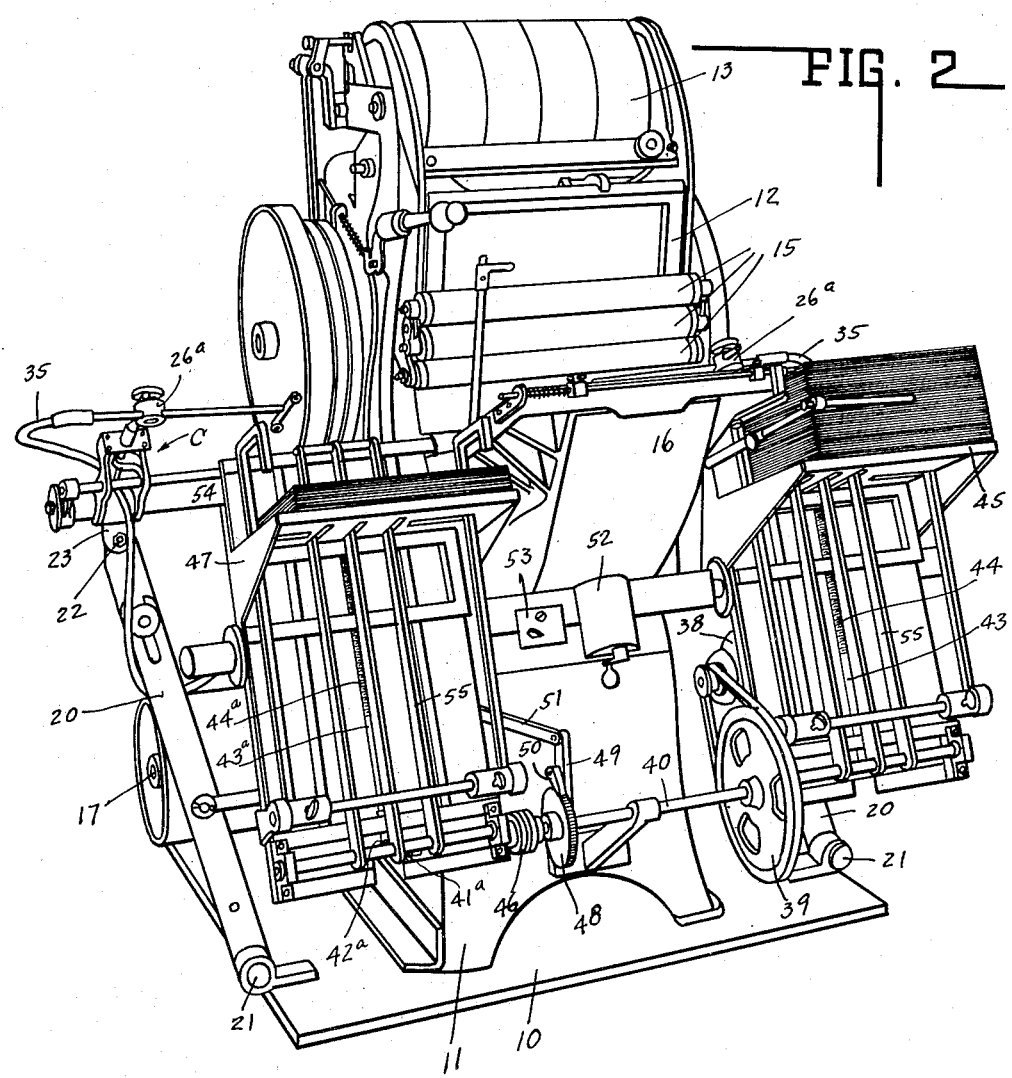

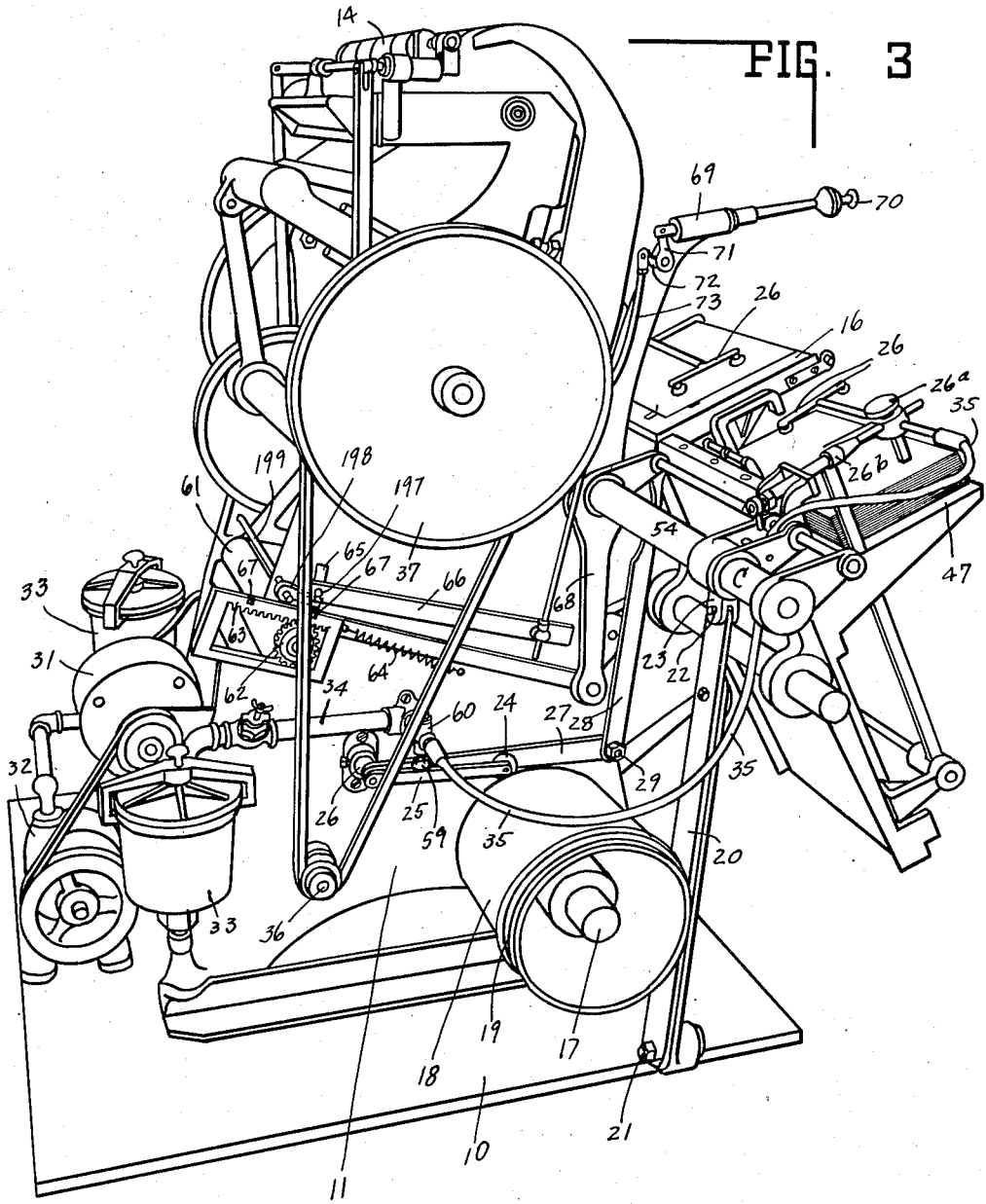

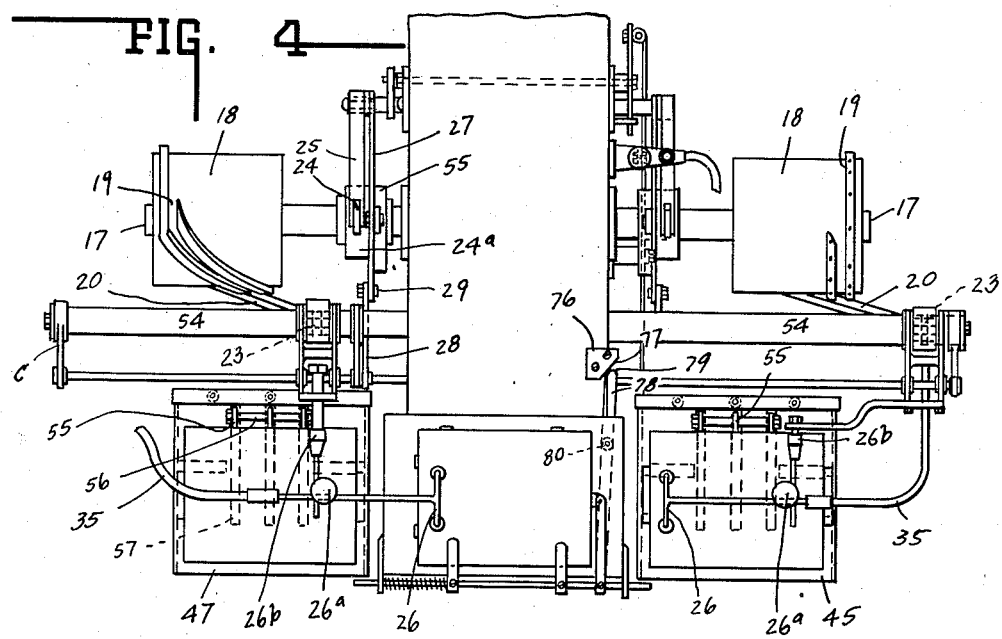
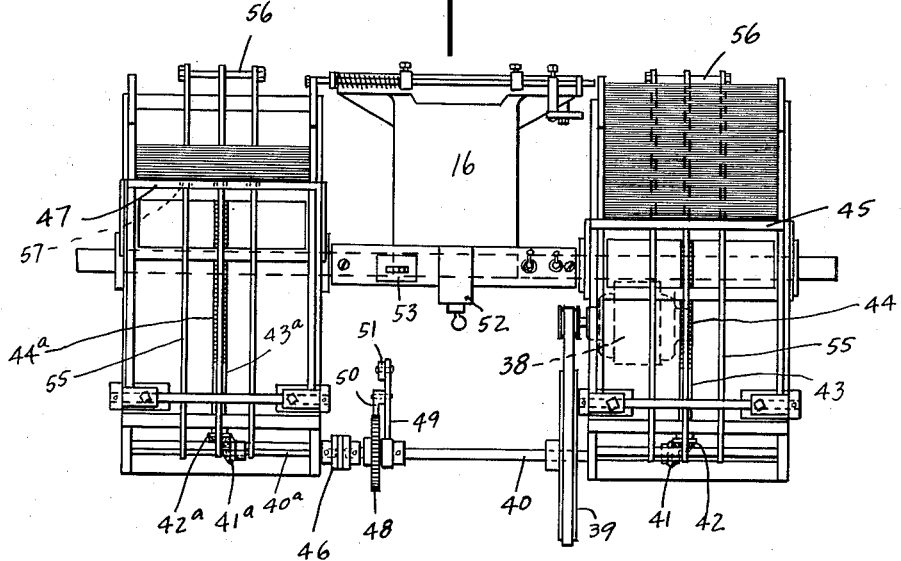

Aug. 21, 1951   H. B. WILLETT   2,565,459
AUTOMATIC RECIPROCATING CROSSWISE FEEDER
FOR OSCILLATING PLATEN PRESSES
Filed Nov. 15, 1945   6 Sheets-Sheet 5
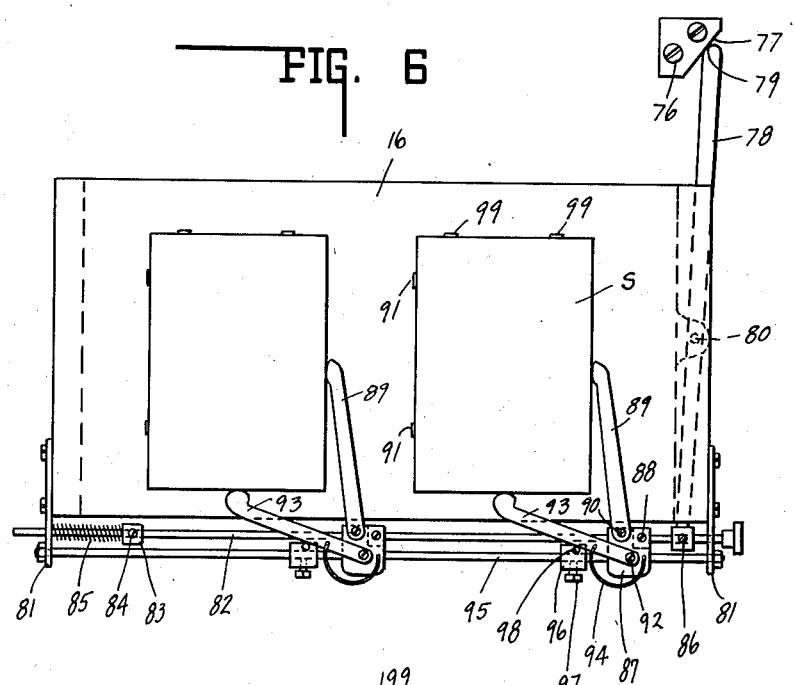
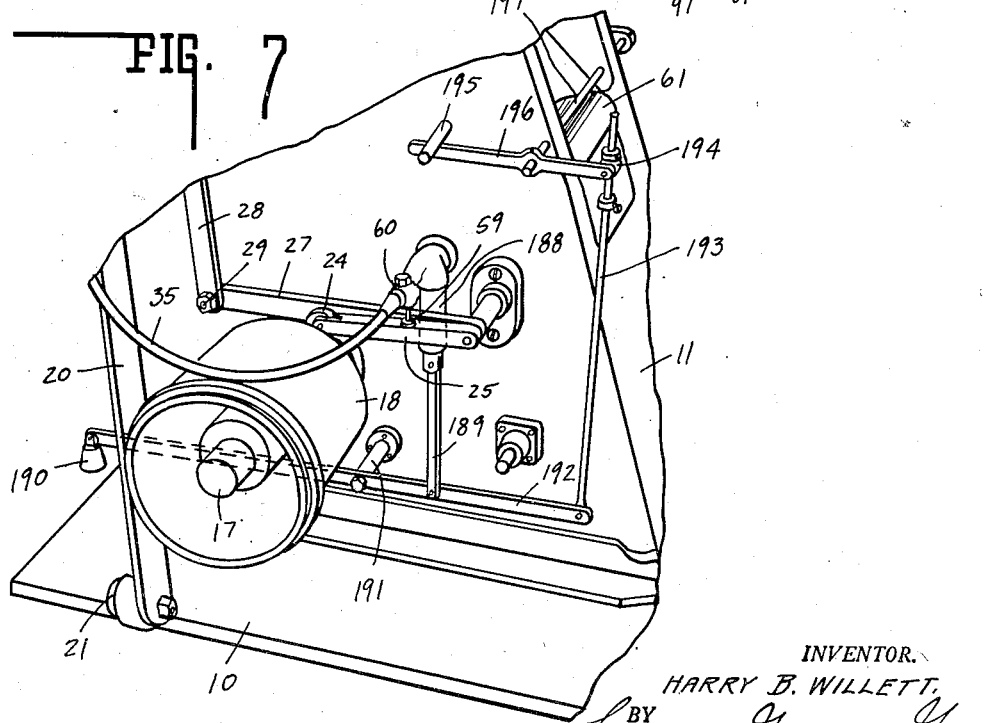
INVENTOR.
HARRY B. WILLETT,
BY
Lockwood, Goldsmith & Galt
ATTORNEYS.

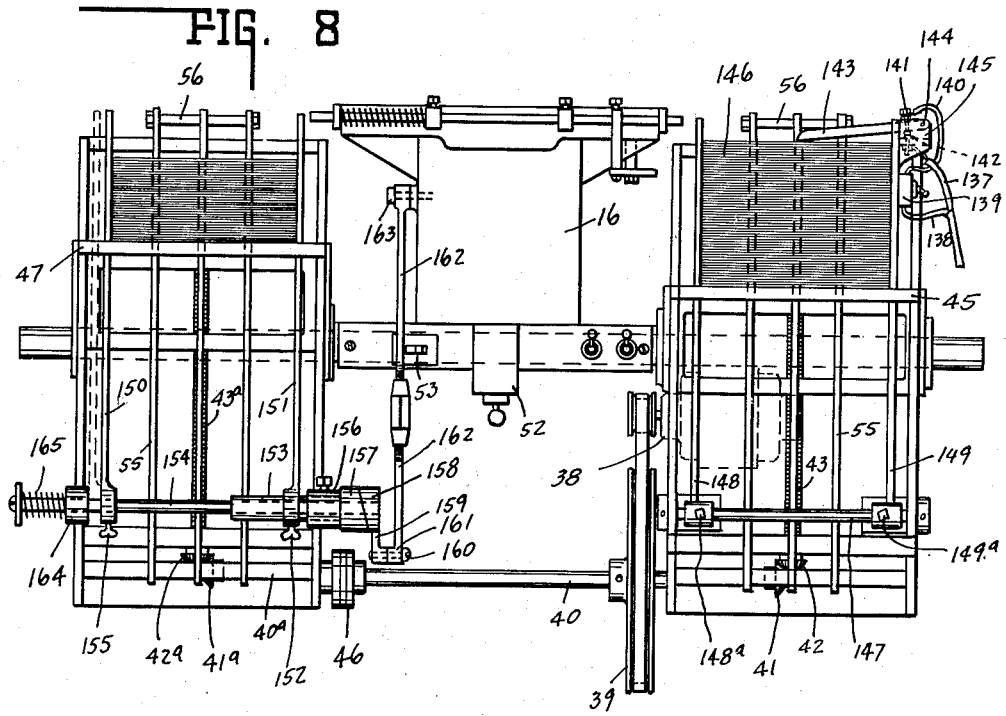

Patented Aug. 21, 1951

2,565,459

UNITED STATES PATENT OFFICE 2,565,459

AUTOMATIC RECIPROCATING CROSSWISE FEEDER FOR OSCILLATING PLATEN PRESSES

Harry B. Willett, Indianapolis, Ind.

Application November 15, 1945, Serial No. 628,835

4 Claims. (Cl. 101—287)

This invention relates to an oscillating platen printing press and means for supplying paper and the like thereto for printing and removal of such paper, etc., therefrom when printed.

The chief object of this invention is to provide a press with cross feeding means for taking a sheet of paper at one side and slightly forwardly of a press, supplying such sheet to a forwardly lowered platen, centering same thereon, removing such printed sheet, following printing, from the platen, and then depositing the removed sheet to the left and slightly forwardly of the press.

Such cross-feeding means broadly is about waist heighth and is in two sections between which the platen oscillates, wherefore all parts are readily accessible to the printer for observation, adjustment, etc.

The chief feature of the present invention resides in cross-feeding from one side of an oscillating platen press to the other side thereof, across the front of the press when the intermediately positioned platen is down or lowered.

One feature of the invention resides in equipping a platen press with manually and automatically operable means for cutting off printing, as hereinafter described.

Other objects and features of the invention will be set forth more hereinafter.

In the drawings Fig. 1 is a perspective front view of a printing press equipped with the invention and with the platen in printing position.

Fig. 2 is a similar view with the platen lowered.

Fig. 3 is a perspective view of the side and back of the press with the blank sheet and printed sheet receiving tables or platforms also being shown, the platen being in lowered position with the sheet transferring mechanism in position preliminary to picking up a blank sheet for transfer and immediately following deposition of a printed sheet.

Fig. 4 is a top plan view of the transfer mechanism and press platen in lowered position, one portion of the former being illustrated in position to pick up a printed sheet on the platen.

Fig. 5 is a front elevation of such transfer mechanism, and more particularly of the automatically levelling tables or platforms.

Fig. 6 is an enlarged top plan view of the platen when in open press position and the sheet centering mechanism in the centering position, said mechanism being of dual sheet type.

Fig. 7 is a perspective view, similar to Fig. 3 but looking at the opposite side of the press and more particularly of the vacuum-failure cut-off mechanism portion thereof.

Fig. 8 is a view similar to Fig. 5 and of a modified and simple embodiment of the table structure and operating mechanism, the latter including an additional electrical control.

Figure 1:
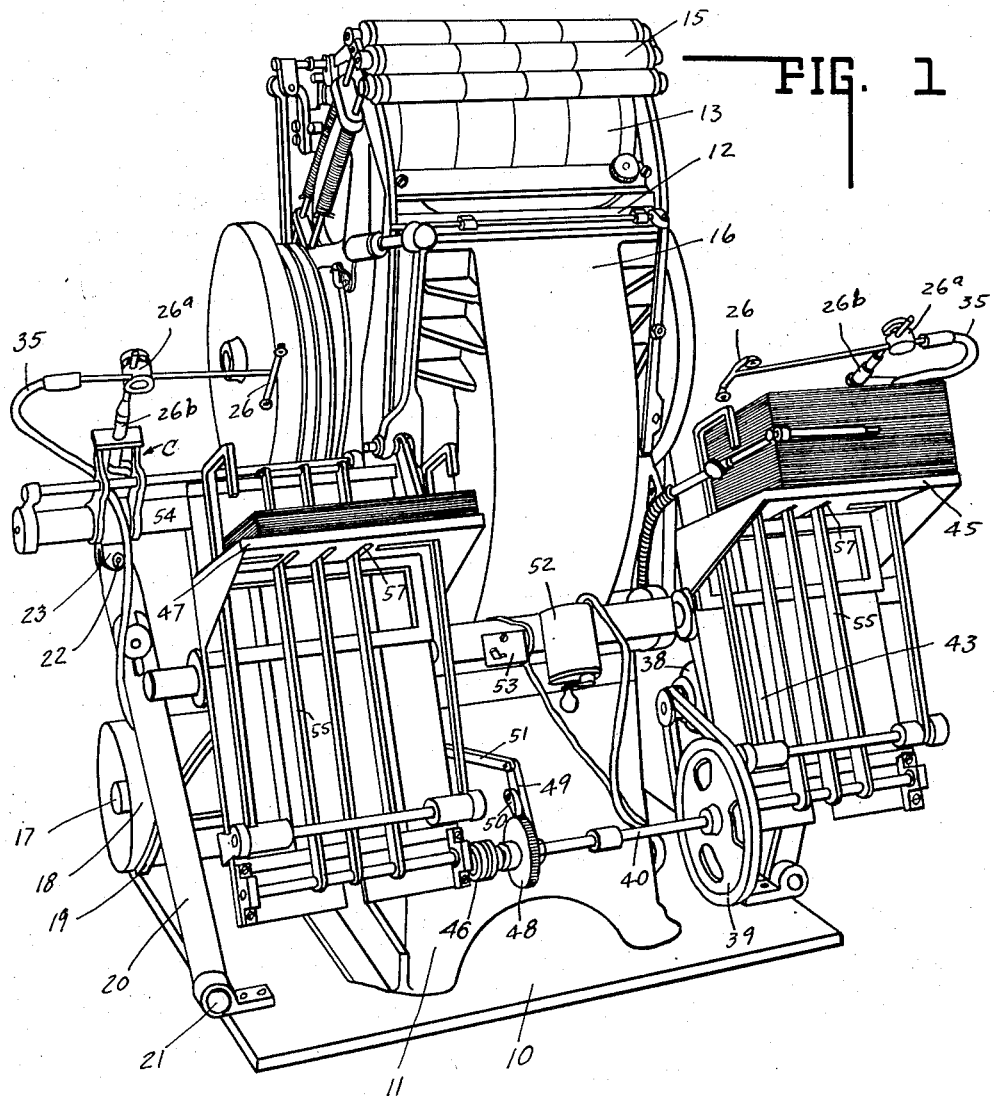

In the drawings 10 indicates the base generally of a vertical press having a vertical base of frame 11 upon which is supported a bed 12, see Fig. 2. Thereabove and rearwardly are inking drums 13, see Figs. 1 and 2, supplied by inking rolls 14, see Fig. 3. Oscillating inking rolls 15 contact drum 13 and take ink therefrom and apply same to the printing form on bed 12 when the platen 16 is in lowered, forward or non-printing position as shown in Fig. 2.

Projecting from each side of the base 11 is shaft 17 driven from the main source of power, not shown, which shaft at each end mounts a cam supporting drum 18 having the groove-forming track 19 thereon. Shaft 17 rotates in timed relation with platen oscillation. Riding in the groove is a roller (not shown) carried by arm 20 pivoted at 21 on base 10. The upper free end of arm 20 is pivoted at 22 to the arm 23 which is connected to the transverse reciprocating carriage C supporting the vacuum operable sheet engaging fingers. A similar mechanism for another carriage C is at the other side of the machine as viewed in Fig. 3 and both mechanisms operate in timed relation as hereinafter described.

At each side of the press is another cam 24a, shown in Fig. 4, which is engageable by roller 24, see Figs. 3 and 4, carried by an arm 25 pivoted on base 11 and this through plunger 59 operates the stem of valve 60 for vacuum application and cut off.

Arm 27 parallel with arm 25 is pivotally connected with rod 28 at 29. Rod 28 at its upper end connects to said carriage mechanism and thus the latter is raised and lowered as determined by the cam 55, see Fig. 4, which is behind drum 18 in Fig. 3 and is also rotatable by shaft 17.

A motor 31 operates vacuum pump 32 to which two vacuum tanks 33 are connected. From each leads a valve controlled line 34 connected by a flexible conduit 35 to the so-called vacuum fingers 26.

The main power (not shown) for operating the press is derived from shaft 36 which belt drives pulley 37. From the shaft driven thereby the several inking rolls and drums are driven, the platen is oscillated, etc., all in timed relation in more or less conventional manner.

A reversible motor 38, see Figs. 1, 2 and 5, belt drives pulley 39 carried by shaft 40. On the right hand portion of shaft 40 is bevel gear 41 meshing with companion gear 42 on shaft 43 which has a thread 44 that raises or lowers platform or table 45. Shaft 40a is aligned with shaft 40, clutch 46 connected thereto, and mounts bevel gear 41a meshing with companion gear 42a on shaft 43a, which has a thread 44a that lowers or raises, respectively, platform 47.

Keyed or otherwise secured to shaft 40 is ratchet 48. Pivoted on pivoted arm 49 is pawl 50. Rod or bar 51 is pivotally connected to arm 49 so that when bar 51 is cam actuated in timed relation with platen operation and finger operation the shafts 40 and 40a are pawl advanced. Thus the blank sheet platform 45 is slowly elevated as the stock is taken therefrom by the fingers and the receiving platform 47 is slowly lowered as the printed sheet is supplied thereto.

This last operation in the first embodiment is by power derived from the press. When the blank stock is exhausted, the printed stock is removed from platform 47, pawl 50 is disengaged and turned back from ratchet 48 and motor 38 energized by the independent reversing switch 52. Then platform 45 is rapidly lowered and platform 47 is rapidly elevated. When the desired relative positions are attained, the blank paper stock is applied to platform 45 and reversing switch 52 reversed and closed. Thus the top sheet of the blank stock rapidly may be brought to the vacuum finger level. When this is attained the switch is cut off, pawl 50 is engaged with rack 48 and normal slow feed of intermittent character prevails.

If the displacement between the platform is greater or less than desired or required, pawl 50 is disengaged as before, clutch 46 is disengaged and motor 38 is energized for rotation in the desired direction to reduce or increase the displacement between the platforms by further elevating or lowering platform 45 relative to platform 47 which, in this operation, does not move. Following this adjustment, the motor 38 is de-energized, the clutch is re-engaged and pawl 50 is engaged with ratchet wheel 49 so that the platforms then move oppositely and intermittently in timed relation as aforesaid, incident to press operation. Suitable switches for multi-speed control, on and off and reverse control of the main power, not shown, may be provided adjacent the quick travel switch 52 aforesaid. One main switch is indicated at 53.

Reference will now be had to Figs. 4 and 5. The vacuum fingers 26 move toward and away from the platforms and move from platform to lowered platen registration and return. Since the printed sheet may vary in size, it is obvious that sheet pile adjustment must be provided.

Herein pivoted at their lower ends are a plurality of upwardly directed bars 55 connected as at 56 and adjustably positioned in parallel slots in the platforms. Any suitable means may be provided for retaining said bars in adjusted in or out position, as desired or required, to locate the piles for sheet registration, etc., depending upon sheet size and printing or composition requirement. Raising and lowering of the platforms obviously is of non-interfering character relative to these sheet pile locators.

Forwardly of carriage C is the finger structure 26 supplied with regulated suction and supported by head 26a in turn adjustably supported at 26b on the carriage. The carriage C, see Fig. 3, is reciprocated to and fro on tube 54 and tilted up and down by rod 28 actuated by cam 55 on power shaft 17 as aforesaid. This shaft, as stated, mounts cam 24a engageable by a roller 24 carried by arm 25 and adjacent thereto is valve stem 59 of vacuum cut-off valve 60. Accordingly, in timed relation, vacuum of regulated amount is applied to fingers 26 and same are raised from and lowered toward the adjacent platform or platen and moved from platen to platform and vice versa.

Referring to Fig. 3, there is illustrated an eccentric 61, a standard part of a platen press. When rotated, and the press is operated, the platen can reciprocate to open and closed position without effecting printing. Vacuum responsive means on the side of the press opposite Fig. 3 disclosure is arranged to rotate the eccentric automatically upon vacuum failure and into position to effect non-printing. This structure is illustrated in Fig. 7.

Rigid with this eccentric, see Fig. 3, is a sprocket 62 associated with rack 63, spring constrained (64) to non-printing position but retained in printing position by dog 65 carried by arm 66 and seating in the forward notch 67 in the rack 63. Rearwardly thereof is another notch 67 for association with the dog. Rod or arm 66 is associated with lever 68 terminating in forward projecting control rod 69 having release structure 70 to 74 associated therewith.

Pressure on portion 70 will release the dog 65 from forward notch 67 and thus effect non-printing. Tilting of arm 69 will effect dog reciprocation and lock the eccentric in non-printing position, due to the rack meshing with gear 62 rotatable with eccentric 61. Hence, manual and automatic control of printing is provided for herein through the means illustrated and thus briefly described and such control means terminates forwardly of the press for ready accessibility.

Reference will now be had more particularly to Figs. 4, 5, and 6. Mounted on the press near the bottom and to one side of the bed is an adjustably secured cam member 76 having face 77. The platen at 80 mounts a pivoted arm 78 the end 79 of which, in platen press closing operation, engages the cam and tilts the arm clockwise, see Fig. 6.

At the upper or outer end of the platen there is slidably supported in bracket arms 81 a rod 82 having fixed thereto at 84 a collar 83. Spring 85 between the collar and adjacent arm 81 constrains rod 82 to the right, whereas the cam actuated arm 78, being pivoted at 86 to said rod, moves the rod to the left in opposition to the spring and before the platen fully closes for printing.

In Fig. 6 there is illustrated, by way of example only, a pair of sheet locaters, although in other figures a single sheet structure is illustrated. Each locater comprises a cross-head 87 adjustably but rigidly secured to rod 82 at 88. A finger 89 is secured to head 87 at 90. When the rod 82 is moved to the left finger 89 engages the sheet S on the platen and moves it until it engages platen mounted stops 91.

Each cross-head pivotally supports at 92 a locating finger 93, normally constrained by spring 94 to non-locating position. Bracket arms 81 carry rod 95 upon which the cross-head 87 rides. On said rod is a stop collar 96 adjustably secured thereto as at 97 and said collar carries pin or cam 98 against which arm 93 bears.

As the head moves to the left by cam 77—end 79 engagement, arm 93 rides pins 98 and moves inwardly and downwardly carrying sheet S therewith until same contacts platen carried stops 99. The two centering and locating arms act together when the platen is closing and the action thereof is so timed that the sheet is properly located for printing immediately prior to printing thereof.

When the platen is opened the arm 78, due to spring 85 returns rod 82 to the right and moves arms 89 and 93 to the right and upwardly on the platen and to the right and downwardly, respectively, see Fig. 6.

In Fig. 7 it is noted that above eccentric 61 is a shaft 199, see also Fig. 3, which carries arm 198 that underlies pin 197 carried by arm 66 which carries dog 65 seatable in either notch 67. When the arm 198 is rotated counter-clockwise (Fig. 3) arm 66 with dog 65 is tilted clockwise to release position and the eccentric moves to non-printing position.

Referring to Fig. 7 the several parts therein disclose an automatic control in the non-printing position. Shaft 199 mounts arm 196, which engages stop 195 on the side of the press. Arm 196 has adjustably connected at 194 thereto rod 193 connected to lever 192 pivoted at 191 and mounting balance weight 190. Lever 192 is connected to piston rod 189 in turn supported in cylinder 188 connected to vacuum line 35, as shown.

When the source of vacuum fails, the arm 192 rotates clockwise on pivot 191 to rock arm 196 to engagement with stop 195. In moving to that position shaft 199 has rotated, see Fig. 3, to release the dog from the forward notch 67 etc., and the eccentric 61 moves to non-printing position. The vacuum is so applied to the piston (not shown) in the cylinder 188 that it normally imposes a lifting force on lever 192, that is, rod 193 is held elevated and arm 196 is away from stop 195.

In Fig. 8 a modified form of multiple table structure and power operation is illustrated. In general, primary numerals herein indicate parts substantially identical to those illustrated in Fig. 5. In the left hand portion of Fig. 8 and interfitted in slots in table 47 are the opposed parallel bars 150 and 151. The latter is adjustably mounted at 152 on sleeve 153 through which extends shaft 154. The former is adjustably secured thereto at 155.

Sleeve 153 extends through bearing 156 and mounts cam 157. Shaft 154 projects therefrom and mounts cooperating cam 158 carrying arm 159 provided with eccentric pin 160 rotatable in eye 161 of adjustable length link 162 pivoted at 163 to platen 16.

The other end of shaft 165 is slidably supported by aligned bearing 164 and associated therewith and the shaft end is spring 165. Spring 165 normally constrains straightening bars 150—151 toward separated relation for printed sheet reception.

When the platen 16 is oscillated, cam 158 against the force of spring 165 draws bars 150 toward bars 151 to straighten and align the printed sheets.

The means for raising and lowering platform 45 and 47 respectively, and vice versa as before, includes reversing switch 52, motor 38 etc., and clutch 46.

In Fig. 5 the feed incident to and in timed relation to printing is through a pawl and ratchet. In Fig. 8 this feed is of electric control type. Herein the side plates 148—149 are adjusted at 148a and 149a respectively, upon support 147.

The unprinted paper stack 146 is mounted on the table 45 between bars or side plates 148—149. Upon bracket 145, secured to plate 149, is pivoted at 144 a contact finger 143. Bracket 145 supports contact 142 while finger 143 supports contact 141. Line 140 leads to switch 139 and line 138 leads therefrom. Line 137 leads to contact 142. Lines 138 and 137 shunt the normal forward portion of switch 52.

When switch 52 is closed to reversed position, table 45 is lowered and table 47 is raised. When closed to the forward position the table 45 is raised and table 47 is lowered. When switch 52 is neutrally positioned switch 139 is closed. If there be no paper engaged by finger 143, gravity constrains the arm 143 counter-clockwise so that switch 141—142 is closed to the motor 38.

As a result the table 45 is elevated by said motor 38 until lever arm 143 is tilted clockwise by said table or the paper thereon. Thereupon, motor actuation ceases and table travel ceases.

Since paper stock varies in thickness the present embodiment is preferred for, as three or five or so sheets are removed from the pile on table 45 and for printing, finger 143 drops and motor 38 is energized to raise table 45 only sufficiently to open switch 141—142. This, in effect, is an "inching" travel.

Accordingly, during printing, in this embodiment, the same power source 38 is used for feed travel as is used for reversing, locating, etc. When reverse travel is desired or constant fast normal travel is desired, switch 52 controls the motor. Switch 139 is opened whenever reverse travel is desired and may be opened when switch 52 is used for forward travel. Finger pressure on arm 143 obviously will serve the same purpose as switch 52 in the forward direction.

While the invention has been illustrated and described in great detail in the drawings and foregoing description, the same is to be considered as illustrative and not restrictive in character.

The several modifications described herein, as well as others which will readily suggest themselves to persons skilled in this art, all are considered to be within the broad scope of the invention, reference being had to the appended claims.

The invention claimed is:

1. In a platen type press having a relatively stationary printing bed and an oscillating platen movable toward and away from the bed, and an eccentric throw-off mechanism therefor, the combination therewith of a sheet translating means of the character described at each side of the platen and forwardly of the bed, each including a platform for supporting a stack of sheets, suction fingers movable over said sheets and platen for engaging and transferring said sheets therebetween, a source of vacuum connected with said fingers, a carriage for mounting said fingers, means for supporting said carriage to permit translatory and swinging movement thereof for picking up and translating the sheets between said platform and platen, mechanism connected with said carriage for effecting said movement in timed relation with the movement of said platen, and linkage interposed between said carriage and throw-off for rendering said carriage inoperative to prevent translatory movement of said sheets upon said platen being rendered inoperative.

2. In a platen type press having a relatively stationary printing bed and an oscillating platen movable toward and away from the bed, the combination therewith of a sheet translating means of the character described at each side of the platen and forwardly of the bed for delivering the uppermost sheet from a stack to the platen, stop members on said platen for receiving and limiting the position of a sheet delivered thereon, a finger movable into engagement with one side of said sheet for sliding it into said position against one of said stops, a second finger engageable with an adjacent side of said sheet for sliding it into position against the other of said stops, a carriage for mounting said fingers, a reciprocating rod carried by said platen along one edge thereof for adjustably supporting said carriage, an actuating lever on said platen operable to move said rod for actuation of said first-mentioned finger for sheet positioning, a spring interposed between said carriage and said second-mentioned finger biasing it from sheet engaging position, and a camming element on said platen for camming said second finger into sheet positioning engagement upon movement of said carriage and first-mentioned finger.

3. In a platen type press having a relatively stationary printing bed and an oscillating platen movable toward and away from the bed, the combination therewith of a sheet translating means of the character described at each side of the platen and forwardly of the bed for delivering the uppermost sheet from a stack to the platen, stop members on said platen for receiving and limiting the position of a sheet delivered thereon, a pair of articulated fingers movable relative to said platen into edge-wise engagement with adjacent side edges of said sheet respectively for positioning it against said stop members, a single carriage for mounting said fingers, one of said fingers being fixed to said carriage, means for moving said carriage in a direction to cause said fixed finger to engage and position said sheet, said second-mentioned finger being pivotally mounted on said carriage, a spring urging said pivoted finger from sheet engaging position, and an adjustable stop member on said platen engageable by said pivoted member for camming it into sheet engaging position upon sheet engaging movement of said carriage.

4. In a platen type press having a relatively stationary printing bed and an oscillating platen movable toward and away from the bed, the combination therewith of a sheet translating means of the character described at each side of the platen and forwardly of the bed for delivering the uppermost sheet from a stack to the platen, stop members on said platen for receiving and limiting the position of a sheet delivered thereon, a carriage slidably mounted on said platen, means for sliding said carriage to and from a predetermined position relative thereto as said platen is moved toward and away from said bed, a pair of articulated sheet positioning fingers mounted on said carriage, on of said fingers being fixedly mounted thereon engaging and moving said sheet in the direction of movement of said carriage against opposed stop members, the other said finger being pivotally mounted on said carriage for engaging an adjacent edge of said sheet and moving it in a transverse direction against the other of said stop members, and means for effecting said movement of the pivoted member by and in timed relation with the sliding movement of said carriage and fixed member.

HARRY B. WILLETT.

REFERENCES CITED

The following references are of record in the file of this patent:

UNITED STATES PATENTS

| Number | Name | Date |
| --- | --- | --- |
| 1,363,200 | Wells et al. | Dec. 21, 1920 |
| 1,376,640 | Reynolds | May 3, 1921 |
| 1,795,971 | Root | Mar. 10, 1931 |
| 1,841,632 | Root | Jan. 19, 1932 |
| 2,091,322 | Kluge et al. | Aug. 31, 1937 |
| 2,123,516 | Thompson | July 12, 1938 |
| 2,258,880 | Bobst | Oct. 14, 1941 |
| 2,367,529 | Root | Jan. 16, 1945 |

FOREIGN PATENTS

| Number | Country | Date |
| --- | --- | --- |
| 791,873 | France | Dec. 18, 1933 |
| 750,266 | France | Aug. 8, 1933 |